(12) United States Patent
Steele et al.

(10) Patent No.: US 12,313,152 B2
(45) Date of Patent: May 27, 2025

(54) TORQUE CONVERTER

(71) Applicant: Allison Transmission, Inc., Indianapolis, IN (US)

(72) Inventors: Derek Steele, Coatesville, IN (US); Kok Chian Ng, Whitestown, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/369,667

(22) Filed: Sep. 18, 2023

(65) Prior Publication Data

US 2025/0092942 A1 Mar. 20, 2025

(51) Int. Cl.
*F16H 41/26* (2006.01)

(52) U.S. Cl.
CPC .................................. *F16H 41/26* (2013.01)

(58) Field of Classification Search
CPC ........................................................ F16H 41/26
See application file for complete search history.

(56) References Cited

U.S. PATENT DOCUMENTS

| | | | |
|---|---|---|---|
| 2,306,758 A | 12/1942 | Heinrich et al. | |
| 2,410,185 A * | 10/1946 | Schneider | F16H 41/26 60/361 |
| 4,131,387 A | 12/1978 | Kazin et al. | |
| 4,624,105 A | 11/1986 | Nishimura et al. | |
| 4,726,185 A * | 2/1988 | Shigemasa | F16H 41/26 60/361 |
| 6,099,435 A * | 8/2000 | Halene | F16H 45/02 192/3.3 |
| 6,290,465 B1 | 9/2001 | Lammas et al. | |
| 6,447,246 B1 | 9/2002 | Abe et al. | |
| 6,899,526 B2 | 5/2005 | Doloresco et al. | |
| 9,151,172 B2 | 10/2015 | Fingerman et al. | |
| 9,267,591 B2 * | 2/2016 | Okaji | F16H 41/26 |
| 9,719,589 B2 * | 8/2017 | Depraete | F16H 41/30 |
| 10,018,050 B2 | 7/2018 | Perrot et al. | |
| 2003/0110764 A1 * | 6/2003 | Kim | F16D 33/20 60/361 |
| 2007/0240411 A1 | 10/2007 | McGrath et al. | |
| 2008/0247878 A1 | 10/2008 | Saitou | |
| 2014/0079570 A1 * | 3/2014 | Schweitzer | F16H 41/26 417/364 |
| 2014/0123637 A1 * | 5/2014 | Okaji | F16H 41/26 416/197 C |
| 2017/0138455 A1 * | 5/2017 | Depraete | F16H 41/30 |
| 2019/0353083 A1 | 11/2019 | Wichers et al. | |
| 2022/0025962 A1 | 1/2022 | Kawashima | |
| 2022/0090665 A1 | 3/2022 | Mori | |

FOREIGN PATENT DOCUMENTS

| | | | | |
|---|---|---|---|---|
| CN | 111022604 A | 4/2020 | | |
| FR | 2793293 A1 * | 11/2000 | ............. | F16H 41/26 |
| GB | 1485029 A | 9/1977 | | |

* cited by examiner

*Primary Examiner* — Thomas E Lazo

(74) *Attorney, Agent, or Firm* — Faegre Drinker Biddle & Reath LLP

(57) ABSTRACT

A torque converter, which may be found in an automotive transmission, is provided. In some examples, the torque converter includes a shell that extends about an axis of rotation, a core that extends about the axis of rotation, and a plurality of curved blades that extend contactedly from the shell to the core. At least one blade of the plurality of curved blades may include a non-ruled surface. The at least one blade of the plurality of curved blades may narrow as it extends from the shell to the core.

22 Claims, 16 Drawing Sheets

TORQUE CONVERTER

TECHNICAL FIELD

The present application relates generally to a torque converter, and more specifically, to a torque converter with curved blades configured for use with an incompressible fluid.

BACKGROUND

Torque converters may be used in a variety of contexts. In some examples, torque converters may be used in transmissions, such as of automobiles, to transfer power from an engine to the transmission. The torque converter may transmit and/or multiply the torque generated by the engine to an input shaft of the transmission.

SUMMARY

Aspects of the present disclosure relate generally to a torque converter, such as may be found in an automotive transmission.

In some examples, a torque converter is provided. The torque converter includes a shell extending about an axis of rotation, a core extending about the axis of rotation, and a plurality of curved blades extending contactedly from the shell to the core. At least one blade of the plurality of curved blades includes a non-ruled surface. The at least one blade of the plurality of curved blades narrows as it extends from the shell to the core.

In some examples, a meridonial length of the at least one blade of the plurality of curved blades at the shell is greater than a meridonial length of the at least one blade of the plurality of curved blades at the core by a factor of between 2 and 6, thereby causing the at least one blade of the plurality of curved blades to narrow as it extends from the shell to the core. The meridonial lengths are measured in a direction along a flow through the torque converter.

In some examples, the torque converter further includes a pump extending about the axis of rotation, and around the plurality of blades, a first radius defined between the axis of rotation and a point along the pump, and a second radius defined between the axis of rotation and a point along the shell opposite the point along the pump. The second radius extends coaxially along the first radius. The first radius subtracted by the second radius defines a height of the torque converter. A ratio of a width of the torque converter, as measured along the axis of rotation, to the height of the torque converter is about 0.75, thereby defining an oblong profile of the torque converter.

In some examples, an entry angle of the at least one blade of the plurality of curved blades at the shell is greater than an entry angle of the at least one blade of the plurality of curved blades at the core by a factor of between 2 and 6.

In some examples, the at least one blade of the plurality of curved blades further includes a first point at which the at least one blade intersects the shell. The first point is tangent to a line extending orthogonally through the axis of rotation. In some examples, the at least one blade of the plurality of curved blades further includes a second point at which the at least one blade intersects the core. The second point is also tangent to the line extending through the axis of rotation.

In some examples, the line is a first line. A second line extending through the axis of rotation intersects a mid-guide of the at least one blade. The first line and the second line define an angle therebetween with a value in the range of about 1 degree to about 10 degrees.

In some examples, the plurality of curved blades are configured for use with an incompressible fluid.

In some examples, the plurality of curved blades are cast metal or machined.

In some examples, a torque converter is provided. The torque converter includes a shell extending about an axis of rotation, a core extending about the axis of rotation, and a plurality of curved blades configured for use with an incompressible fluid. The plurality of blades extend between the shell and the core. At least one blade of the plurality of curved blades includes a first point at which the at least one blade intersects the shell. The first point is tangent to a line extending orthogonally through the axis of rotation. The at least one blade of the plurality of curved blades further includes a second point at which the at least one blade intersect the core. The second point is also tangent to the line extending through the axis of rotation. The at least one of the plurality of curved blades includes a non-ruled surface.

In some examples, the at least one blade of the plurality of curved blades extends contactedly from the shell to the core.

In some examples, the line is a first line. A second line extending through the axis of rotation intersects a mid-guide of the at least one blade. The first line and the second line define an angle therebetween with a value in the range of about 1 degree to about 10 degrees.

In some examples, the at least one blade of the plurality of curved blades narrows as it extends from the shell to the core.

In some examples, a meridonial length of the at least one blade of the plurality of curved blades at the shell is greater than a meridonial length of the at least one blade of the plurality of curved blades at the core by a factor of between 2 and 6, thereby causing the at least one blade of the plurality of curved blades to narrow as it extends from the shell to the core. The meridonial lengths are measured in a direction along a flow through the torque converter.

In some examples, an entry angle of the at least one blade of the plurality of curved blades at the shell is greater than an entry angle of the at least one blade of the plurality of curved blades at the core by a factor of between 2 and 6.

In some examples, the plurality of blades are cast metal or machined.

In some examples, a torque converter is provided. The torque converter includes a shell extending about an axis of rotation, a core extending about the axis of rotation, a plurality of blades curving contactedly from the shell to the core, a turbine extending about the axis of rotation, and around the plurality of blades, a first radius defined between the axis of rotation and a point along the turbine, and a second radius defined between the axis of rotation and a point along the shell opposite the point along the turbine. The second radius extends coaxially along the first radius. The first radius subtracted by the second radius defines a height of the torque converter. A ratio of a width of the torque converter, as measured along the axis of rotation, to the height of the torque converter is about 0.75, thereby defining an oblong profile of the torque converter.

In some examples, the plurality of blades include a nonruled surface.

In some examples, at least one blade of the plurality of blades includes a first point at which the at least one blade intersects the shell and a second point at which the at least one blade intersect the core. The first point is tangent to a line extending orthogonally through the axis of rotation, and the second point is also tangent to the line extending through the axis of rotation.

In some examples, a meridonial length of the at least one blade of the plurality of blades at the shell is greater than a meridonial length of the at least one blade of the plurality of blades at the core by a factor of between 2 and 6, thereby causing the at least one blade of the plurality of blades to narrow as it extends from the shell to the core. The meridonial lengths are measured in a direction along a flow through the torque converter.

In some examples, an entry angle of the at least one blade of the plurality of blades at the shell is greater than an entry angle of the at least one blade of the plurality of blades at the core by a factor of between 2 and 6.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters may indicate corresponding parts throughout the several views. Unless stated otherwise the drawings are proportional and drawn to scale.

DETAILED DESCRIPTION OF THE DRAWINGS

Figure 1:
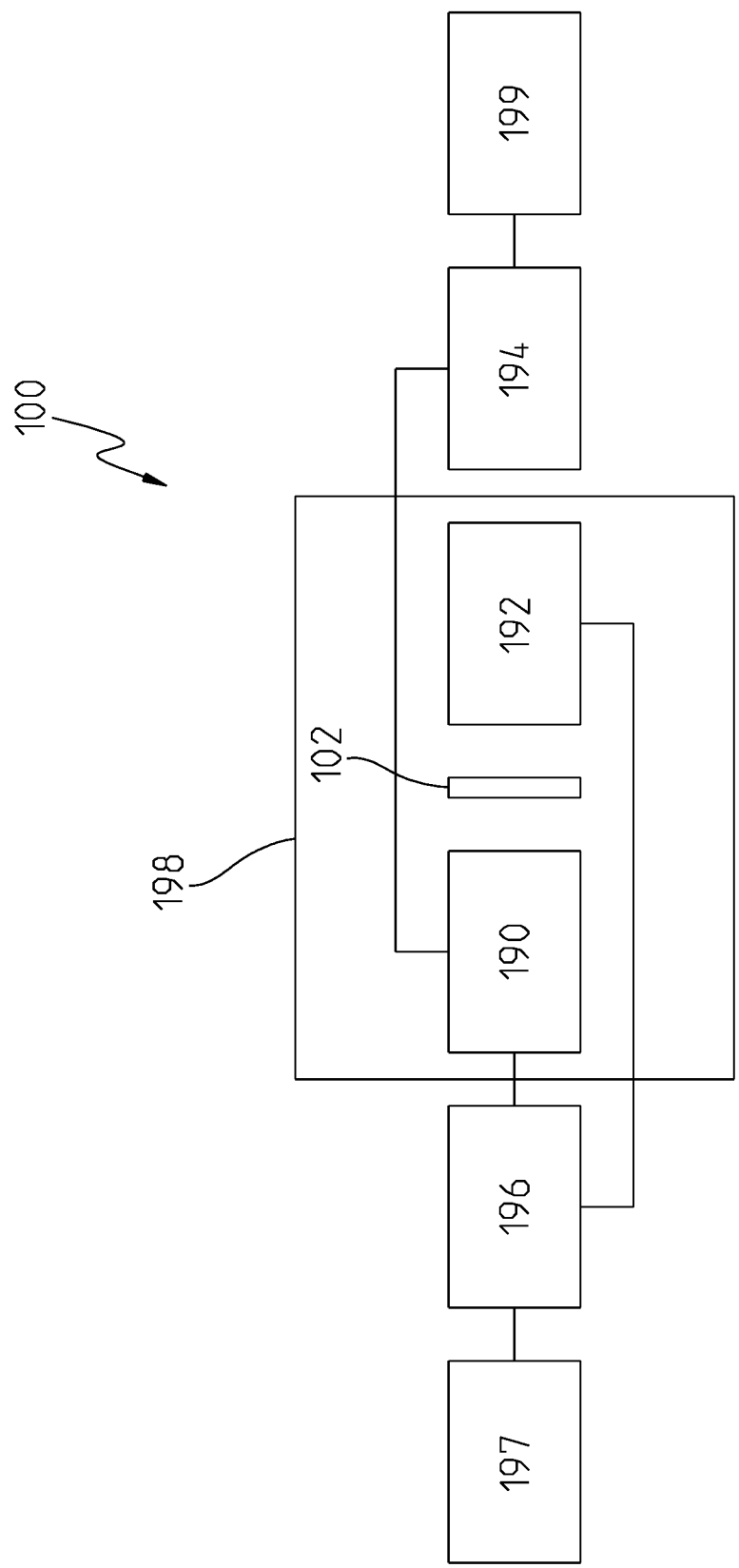
FIG. 1 illustrates a schematic representation of a torque converter, according to some aspects described herein.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the structures and components disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Further, throughout the disclosure, the terms "about", "substantially", and "approximately" mean plus or minus 5% of the number or geometric constraint that each term precedes. For example, about 100 may mean 100+/5. Additionally, or alternatively, substantially orthogonal may mean that any 90 degree angle related to the described orthogonality may be between 85.5 degrees and 94.5 degrees (inclusive).

As mentioned above, torque converters may be used in a variety of contexts. In some examples, torque converters may be used in transmissions, such as of automobiles, to transfer power from an engine to the transmission. The torque converter may transmit and/or multiply the torque generated by the engine to an input shaft of the transmission.

In some transmissions, only a limited amount of space may be available to fit a torque converter. In such transmissions, the torque converter may feature a torus which has a cross section that is elliptical or otherwise has a reduced axial width relative to the radial height of the section, such as where a traditional section would otherwise be circular (e.g., with an equivalent width and height). An advantage, among others, of this reduced axial width may be this reduced axial width can provide significant benefit in reducing the amount of space that the torque converter occupies within an assembly. Certain challenges can arise by use of reduced axial width torque converters, as the torque converters can have a non-uniform flow area from the leading edge to the trailing edge of two adjacent blades on the pump (or turbine). This non-uniform flow area can affect three dimensional flow fields. Flow may be most restricted somewhere between leading and trailing edges of a blade. In some cases, the restricted flow causes a non-compressible fluid to be subject to low pressure zones that allow cavitation to occur. Cavitation may occur when bubbles, or voids, form within a fluid because the pressure quickly drops below a vapor pressure. When the bubbles experience higher pressures, they may collapse, creating small shockwaves that, over time, can negatively impact surface durability and/or performance of a torque converter.

Accordingly, there exists a need to mitigate and/or eliminate cavitation within torque converters. Cavitation can reduce the lifetime of a torque converter and/or disrupt desired performance of the torque converter. Furthermore, there exists a need to increase power density of a transmission assembly, by efficiently using space of the transmission assembly.

Aspects of the present disclosure can be advantageous to address the above problems, as well as additional problems that may be recognized by those of ordinary skill in the art. Generally, as explained herein, in embodiments, specific curvature features of a stator blade of a torque converter can alter a three dimensional flow field in a manner that helps to equalize pressure, thus reducing potential to cavitate. Additionally, curving blades of a torque converter, in the manner described herein, can help to mitigate cavitation within torque converters, thereby allowing the torque converter to work more effectively and improve a lifetime thereof. The torque converter described herein can increase cavitation threshold, therefore increasing input rating. Further, the torque converter described herein may reduce a space claim of (e.g., an amount of volumetric space occupied by) the torque converter for increased power density of an overall transmission assembly.

Generally, a torque converter includes a turbine, pump, and stator. The turbine, pump, and stator work together to transmit and multiply torque from an engine to a transmission. The pump is typically connected to a crankshaft of the engine. The pump consists of a housing and an impeller. As the engine rotates, it drives the pump, causing it to spin and create a flow of transmission fluid within the torque converter. The turbine is the component that is connected to the transmission input shaft. The turbine is located downstream from the pump within the torque converter. The turbine consists of a housing and a turbine wheel. As the fluid flows from the pump, it strikes the turbine blades of the turbine wheel, causing the turbine to rotate. The stator is a stationary component (in conditions of high relative speed of the pump to the turbine) positioned between the pump and the turbine within the torque converter. It consists of a housing and a stator assembly. The stator's main function is to redirect the fluid flow from the turbine back to the pump in a way that optimizes torque multiplication and overall efficiency.

FIG. 1 illustrates a schematic representation of a torque converter 100 according to some aspects described herein. The torque converter 100 includes a stator 102 disposed between a turbine 190 and a pump 192. A shaft 194 is coupled to the turbine 190 and a flywheel 196 is coupled to the pump 192. A housing or enclosure 198 extends about the stator 102, turbine 190, and pump 192. The flywheel 196 may be coupled to a prime mover such as an internal combustion engine, external combustion engine, electric motor, or other prime mover known in the art 197. Further, the shaft 194 may be coupled to a transmission 199.

Figure 2:
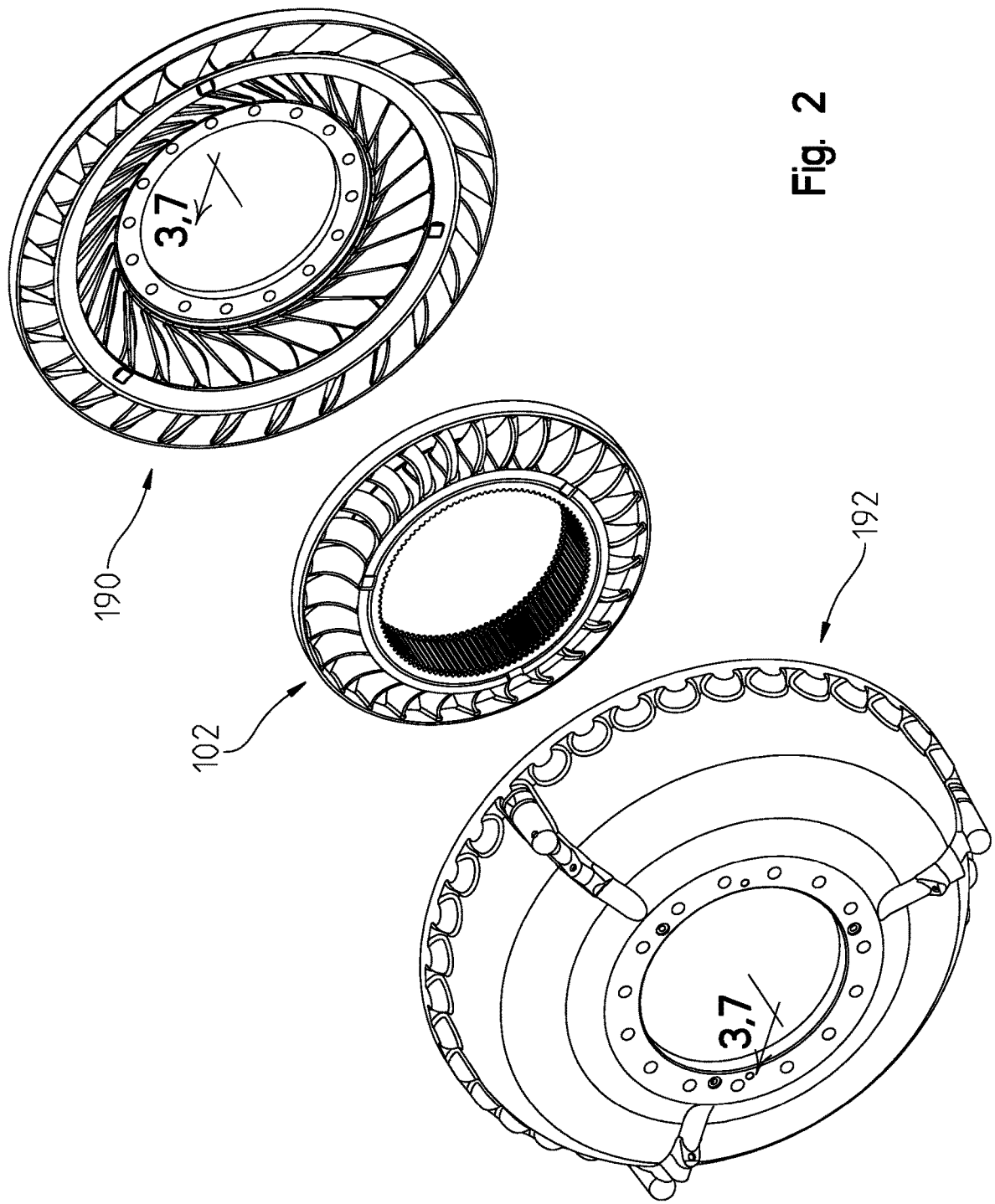
FIG. 2 illustrates an expanded isometric view of a torque converter, according to some aspects described herein.
Figure 3:
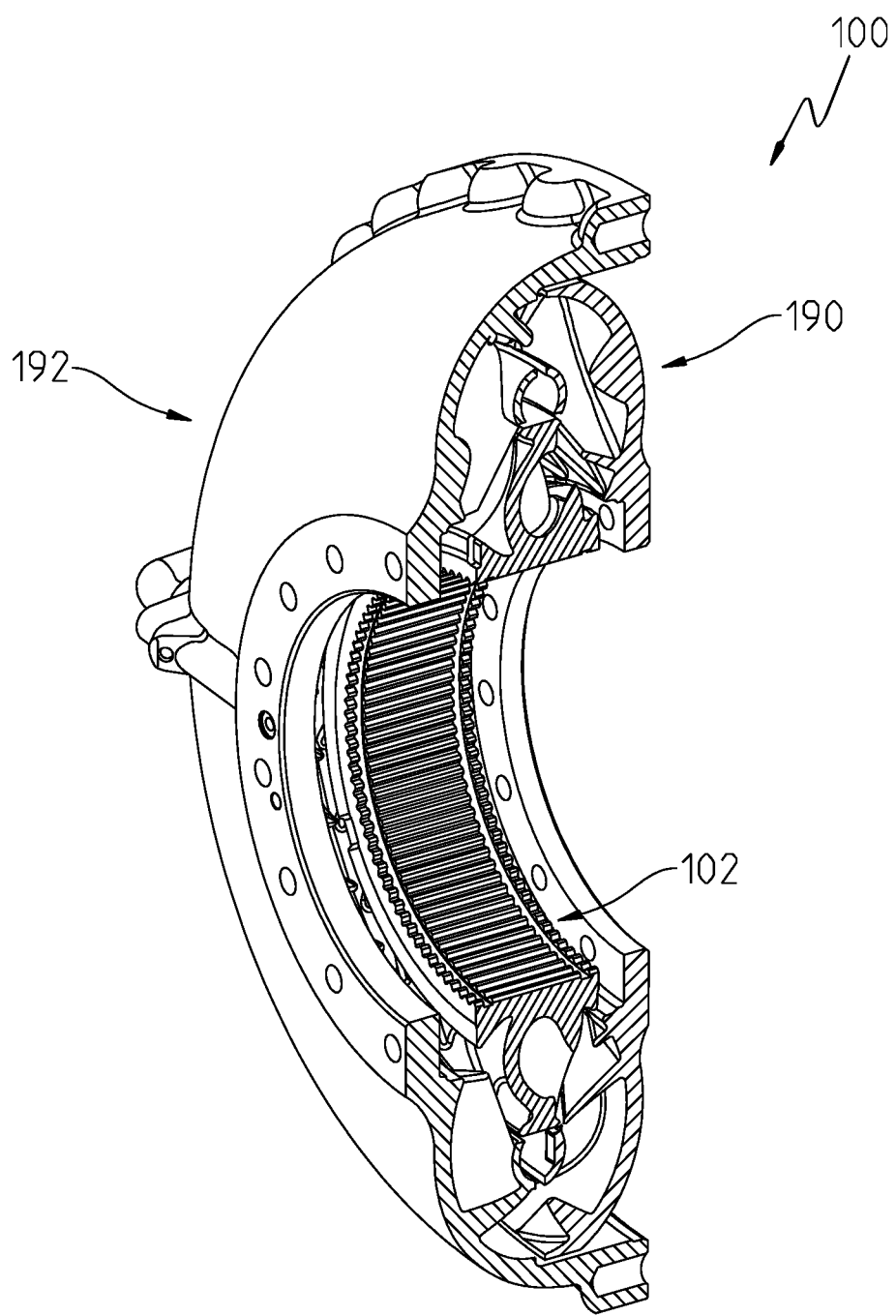
FIG. 3 illustrates an isometric cross-sectional view of the torque converter of FIG. 2, according to some aspects described herein.

FIG. 2 illustrates an expanded isometric view of the torque converter 100 according to some aspects described herein. FIG. 3 illustrates a cross-sectional view of the torque converter 100 according to some aspects described herein. FIGS. 2 and 3 further illustrate the stator 102, the turbine 190, and the pump 192.

Figure 4:
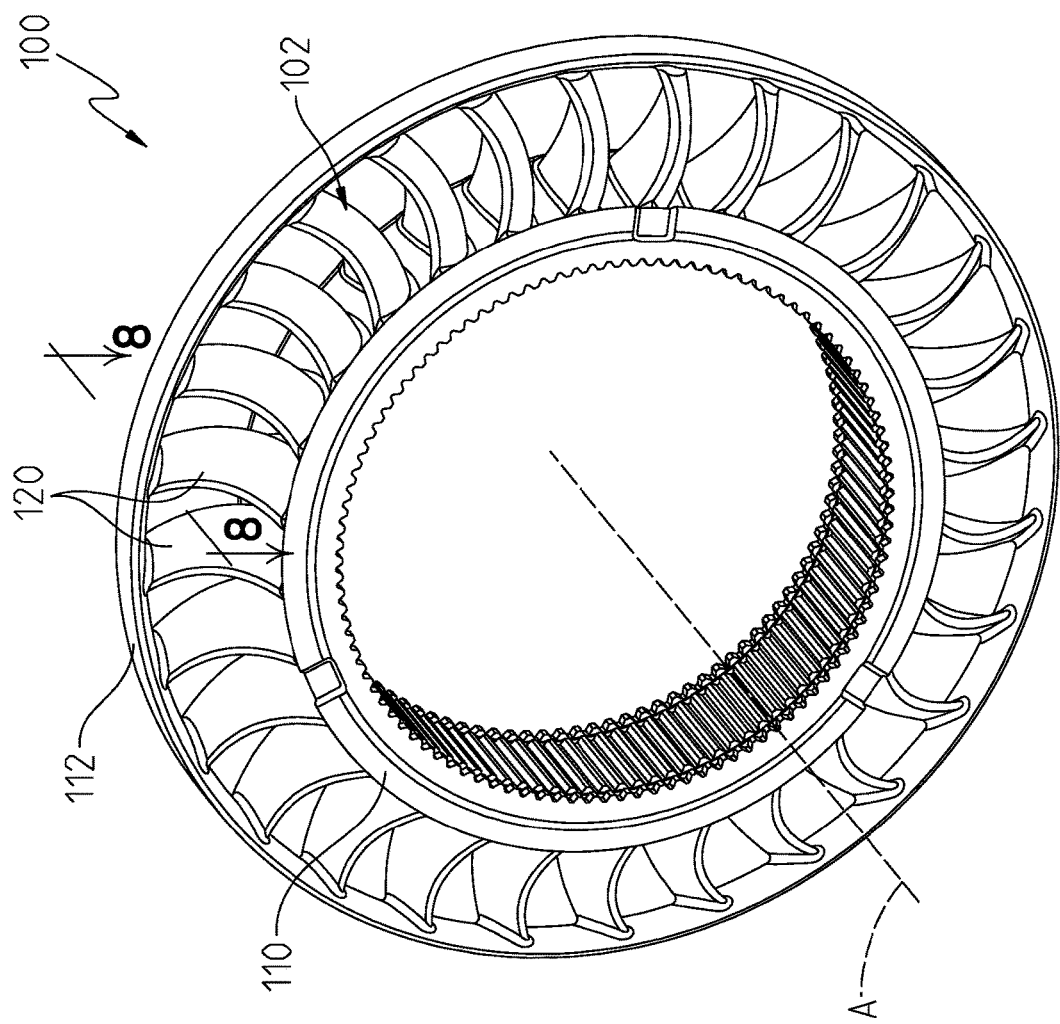
FIG. 4 illustrates a top, rear, and right-side isometric view of the stator of FIG. 2, according to some aspects described herein.
Figure 6:
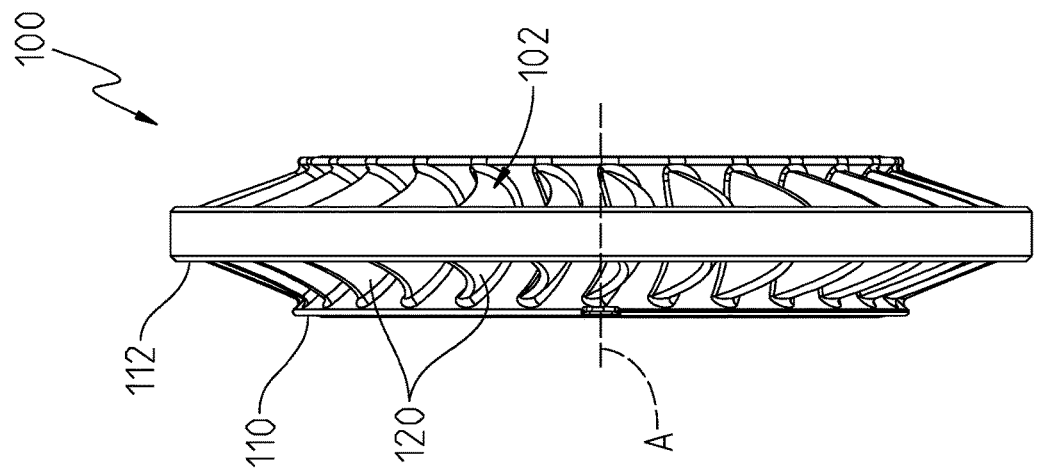
FIG. 6 illustrates a right-side elevational view of the stator of FIG. 2, according to some aspects described herein.
Figure 5:
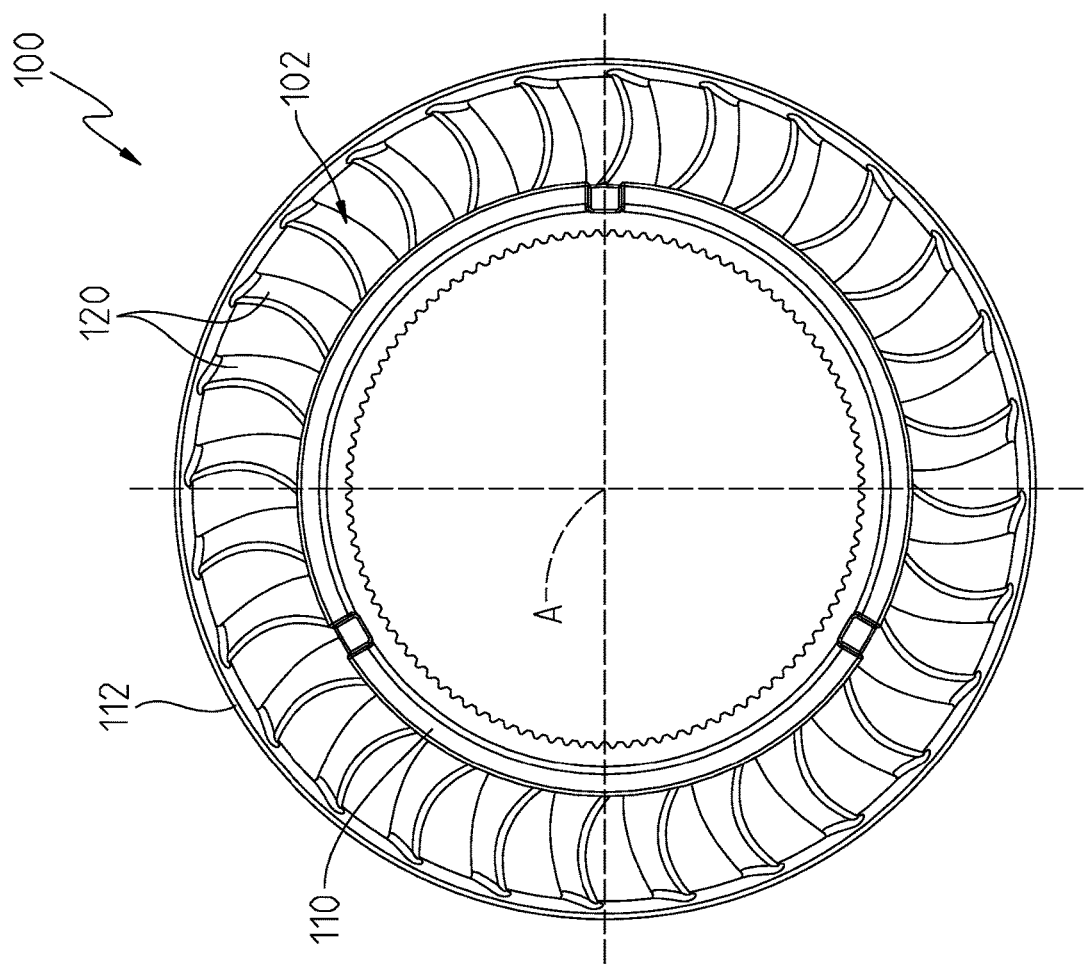
FIG. 5 illustrates a rear planar view of the stator of FIG. 2, according to some aspects described herein.

FIG. 4 illustrates a top, rear, and right-side isometric view of the stator 102 of the torque converter 100, according to some aspects described herein. FIG. 5 illustrates a rear planar view of the stator 102 of the torque converter 100, and FIG. 6 illustrates a right-side elevational view of the stator 102 of the torque converter 100. For clarity, and to highlight aspects of the stator 102 of the torque converter 100, some aspects of the torque converter 100 are not shown in FIGS. 4-6, but such aspects should be recognized by those of ordinary skill in the art at least in light of teachings provided herein.

The stator 102 includes a shell 110 extending about an axis of rotation A, and a core 112 extending about the axis of rotation A. In some examples, the shell 110 extends radially symmetric about the axis of rotation A. In some examples, the shell 110 is generally cylindrical. Similarly, in some examples, the core 112 extends radially symmetric about the axis of rotation A. In some examples, the core 112 is generally cylindrical.

The stator 102 includes a plurality of curved blades 120 that extend from the shell 110 to the core 112. The curved blades 120 of the stator 102 are separate and distinct from blades of a pump and/or turbine. In some examples, each of the plurality of curved blades 120 extend from the shell 110 to the core 112, whereas in other examples one or more of the curved blades 120 (e.g., but not all of the curved blades 120) extend from the shell to the core 112. Accordingly, in some examples, at least one of the plurality of curved blades 120 extends contactedly from the shell to the core. In some examples, the plurality of curved blades 120 extend between the shell 110 and the core 112. In some examples, the plurality of curved blades 120 are stator blades.

In some examples, the plurality of curved blades 120 extend contactedly from the shell 110 to the core 112. When extending contactedly, the plurality of curved blades actually contact and/or attach at both of the shell 110 and the core 112 (e.g., as opposed to the plurality of curved blades being cantilever by contacting only one of the shell 110 and/or the core 112).

In some examples, at least one of the plurality of curved blades 120 includes a non-ruled surface. A non-ruled surface is a three-dimensional surface that cannot be generated by a straight line moving in space. Unlike ruled surfaces, which can be formed by a line sweeping along a set of points, non-ruled surfaces may exhibit complex and varying curvatures.

Non-ruled surfaces can have intricate and irregular shapes that do not conform to a simple linear or planar pattern, such as because they do not have a uniform appearance and/or definition. Accordingly, non-ruled surfaces may require relatively sophisticated mathematical descriptions and/or analytical techniques to define their curvature properties.

Some aspects of the curvature of the non-ruled surface of the blades 120 is defined in further detail below with respect to FIGS. 9A-9C. In some examples, the plurality of curved blades 120 are configured for use with an incompressible fluid (e.g., water, oil. For example, the plurality of curved blades 120 may be sized, shaped, and/or coupled within the stator 102 to accommodate the properties of incompressible fluids, such as opposed to being sized, shaped, and/or coupled within the stator 102 to accommodate the properties of a compressible fluid (e.g., air). It is noted that incompressible fluids are used for different applications compared to compressible fluids (e.g., which may be used for gas turbines, such as in conjunction with airfoils), and have different physical properties which may need to be accommodated when designing blades to be used therewith.

In some examples, the plurality of curved blades 120 are cast metal. Cast metals possess several properties that make them suitable for a wide range of applications. Cast metals generally have good strength, allowing them to withstand heavy loads and forces. The strength of cast metal can be enhanced by alloying or heat treatment processes. Casting processes enable the production of complex shapes and intricate details (e.g., as may be required for the non-ruled surfaces of the plurality of curved blades 120 described herein). Cast metals are known for their durability and resistance to wear, corrosion, and other environmental factors. This makes them suitable for applications that require long-lasting and reliable components. Cast metals, such as aluminum and copper alloys, have high thermal conductivity. This property allows for efficient heat transfer, making them suitable for applications involving heat dissipation or thermal management (e.g., of incompressible fluids in an automotive transmission).

In some examples, the plurality of curved blades 120 are machined. Machined metals, which are metals that have undergone machining processes such as cutting, drilling, milling, or turning, possess distinct properties that can vary depending on factors such as the metal type, machining method, and specific machining parameters. Machining processes are known for their ability to achieve precise dimensional accuracy. Machined metals can be manufactured to meet tight tolerances and specific geometric requirements, ensuring consistent and precise dimensions (e.g., as may be desirable for the specific geometric requirements of the non-ruled surfaces provided herein). In some cases, machined metals may have increased hardness localized in machined region, which can be beneficial for performance of the machined metal. Machining processes can alter the microstructure of the metal, particularly in the heat-affected zones. Proper selection of cutting parameters and techniques can preserve a material's integrity. Some machined metals, such as copper and aluminum alloys, have high thermal conductivity. This property allows for efficient heat transfer and can be advantageous in applications involving heat dissipation or thermal management (e.g., of incompressible fluids in an automotive transmission).

Accordingly, in some examples, the plurality of blades 120 are cast metal or machined for one or more of the specific mechanical properties and/or advantages discussed above.

Figure 7:
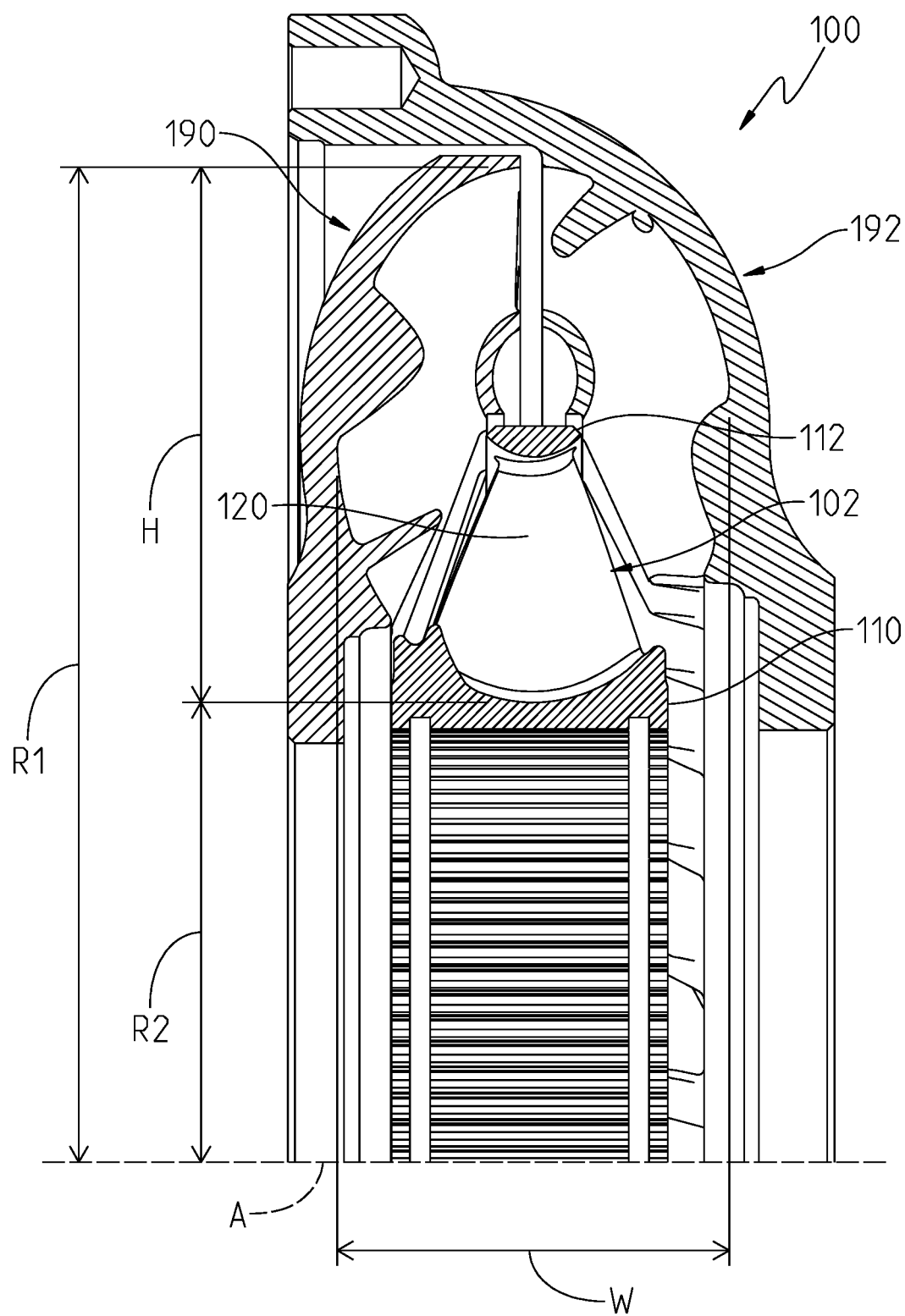
FIG. 7 illustrates a partial cross-section of the right-side elevational view of the torque converter of FIG. 2, according to some aspects described herein.

FIG. 7 illustrates a partial cross-section of the right-side elevational view of the torque converter 100 of FIG. 2, including the stator 102, turbine 190, and pump 192, according to some aspects described herein. A first radius R1 is defined between the axis of rotation A and the outermost point of the toroidal fluid domain, such as a point on the turbine 190, on the pump 192, and/or between the turbine 190 and pump 192, inside of the toroidal fluid domain, and at which the turbine 190 and the pump 192 interact/interface. It should be noted that the turbine 190 and pump 192 may interact/interface without contacting each other (e.g., by being in proximity, but spaced apart from one another, as shown in FIGS. 3 and 7). A second radius R2 is defined between the axis of rotation A and the innermost point of the toroidal fluid domain (e.g., a point on the shell 110).

The second radius R2 extends coaxially along the first radius R1. The first radius R1 subtracted by the second radius R2 defines a height H of the torque converter 100 (e.g., a height of the toroidal fluid domain of the torque converter 100). A width W of the torque converter 100 (e.g., of the toroidal fluid domain of the torque converter 100) is measured parallel along the axis of rotation A by outermost points of the toroidal fluid domain (e.g., respective points along surfaces of the turbine 190 and pump 192 that define the toroidal fluid domain). A ratio W/H may be defined of the width W of the torque converter 100 (e.g., the width of the toroidal fluid domain of the torque converter 100), as measured along the axis of rotation A, to the height H of the torque converter 100 (e.g., the height of the toroidal fluid domain of the torque converter 100). The ratio W/H may about 0.75, thereby defining an oblong profile of the torque converter 100. In some examples, the ratio W/H is exactly 0.75. In some examples, the width W is about 86 millimeters and/or in some examples the height H is about 115 millimeters. In some examples the first radius R1 is about 210 millimeters and/or in some examples the second radius R2 is about 95 millimeters.

Figure 8:
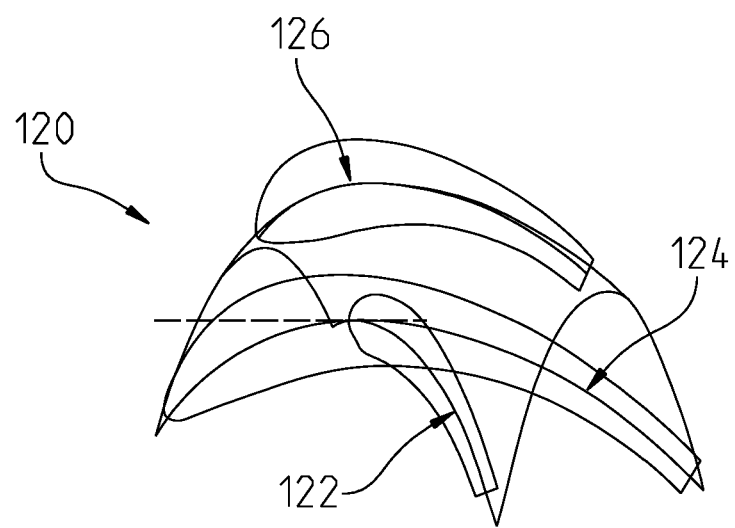
FIG. 8 illustrates a top planar view of a blade of the stator of FIG. 2, according to some aspects described herein.

FIG. 8 illustrates a top planar view of a blade 120 of the stator 102 of FIG. 2, according to some aspects described herein. The blade 120 includes a core projection 122 (e.g., an end that attaches to the core 112), a shell projection 124 (e.g., an end that attaches to the shell 110), and a biasing guide 126 located radially between the shell projection 124 and the core projection 122. In some examples, the biasing guide 126 may be substantially radially equidistant between the core 112 and the shell 110. In some examples, the biasing guide 126 is located in closer radial proximity to the shell 110. In some examples, the biasing guide 126 is located in closer radial proximity to the core 112.

As shown in FIG. 8, the blade 120 narrows as it extends from the shell projection 124 to the core projection 122. Accordingly, in some examples, at least one of the plurality of curved blades 120 narrows as it extends from the shell 110 to the core 112.

In some examples, a meridonial length may be measured across the blade 120 in a direction along a flow path across the blade 120 (e.g., generally in a direction along the axis of rotation A, which extends radially from the shell 110 to the core 112. The flow across the blade 120 may be based on a direction of flow through the torque converter 100 (e.g., generally in a direction along the axis of rotation A, which extends radially from the shell 110 to the core 112). The direction of flow through the torque converter 100 is a reference that should be recognized by those of ordinary skill in the art based on the structure of the torque converter 100 (e.g., a flow from a pump to a turbine, across the blade 120 of the stator 102).

In some examples, a meridonial length of the at least one of the curved blades 120 at the shell 110 is greater than a meridonial length of the at least one of the curved blades 120 at the core 112, thereby causing the at least one of the curved blades to narrow as it extends from the shell to the core. In some examples, the meridonial length of the at least one of the curved blades 120 at the shell 110 is greater than the meridonial length of the at least one of the curved blades 120 at the core 112 by a factor of between 2 and 6.

Figure 9A:
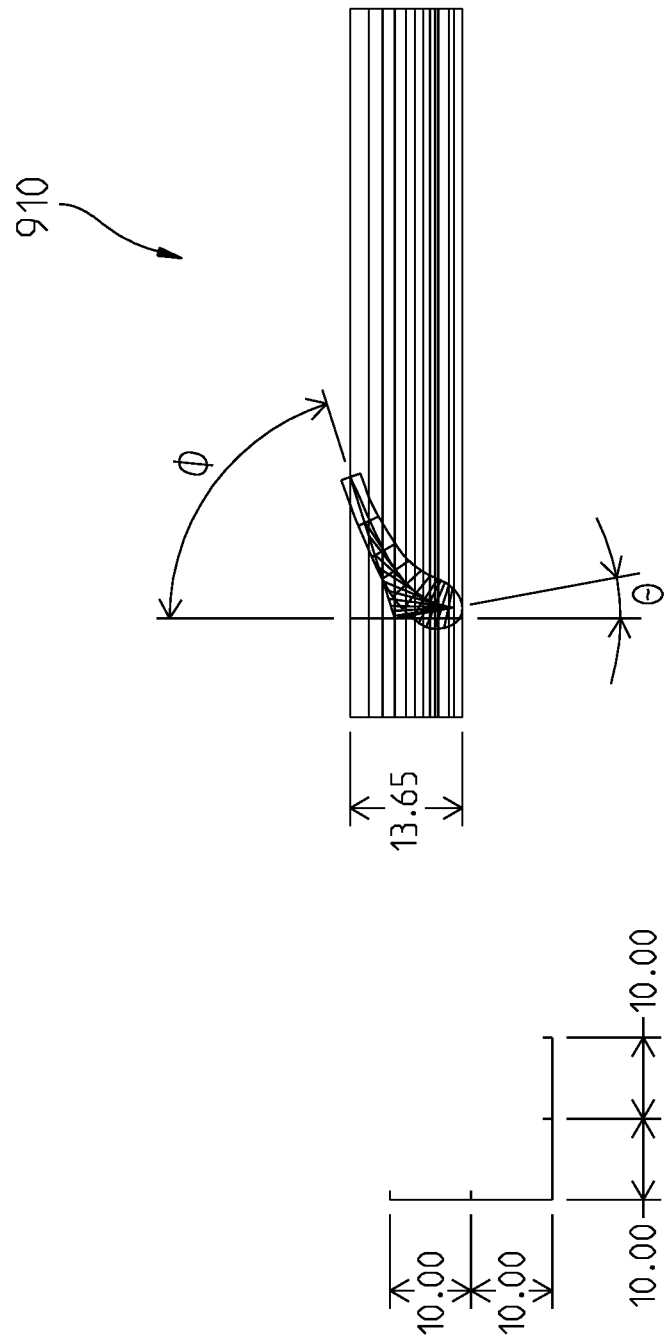
FIG. 9A illustrates a meridonial and longitudinal definition of the mean camber line of the blade of FIG. 8, according to some aspects described herein.

FIG. 9A illustrates a traditional curvature definition 910 of the blade 120 of FIG. 8 according to some aspects described herein. Specifically, FIG. 9A illustrates the traditional curvature definition of the blade 120 at the intersection to the core 112. FIG. 9B illustrates a traditional curvature definition 920 of the blade 120 of FIG. 8, according to some aspects described herein. Specifically, FIG. 9B illustrates the traditional curvature definition of the blade 120 at the intersection to the biasing guide 126. FIG. 9C illustrates a traditional curvature definition 930 of the blade 120 of FIG. 8, according to some aspects described herein. Specifically, FIG. 9C illustrates the traditional curvature definition of blade 120 at the intersection to the shell 110. FIGS.

9A-9C are drawn to scale and parameterized by coordinates toroidal meridian (m) and longitude (1).

Figure 10:
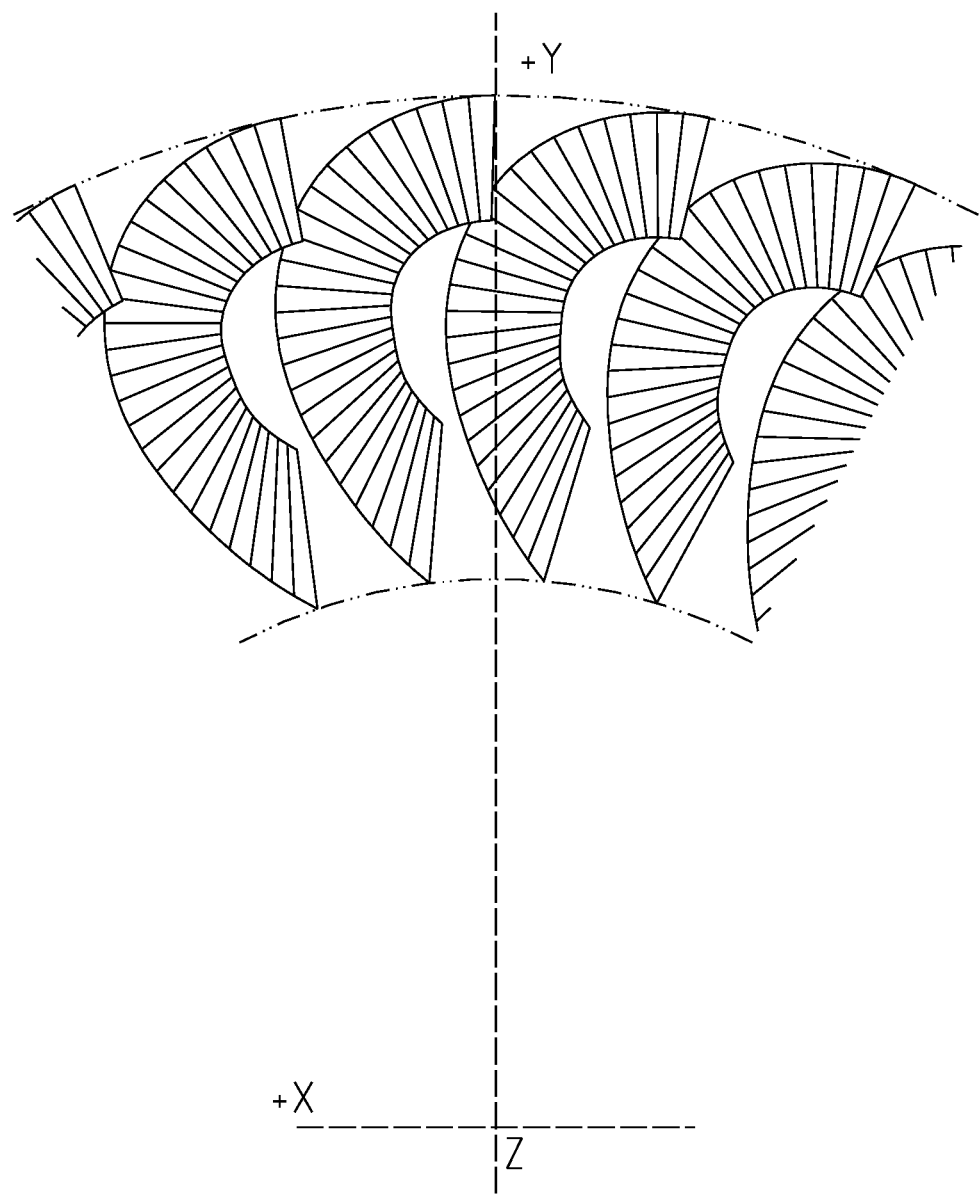
FIG. 10 illustrates blades with zero bias, according to some aspects described herein.
Figure 11:
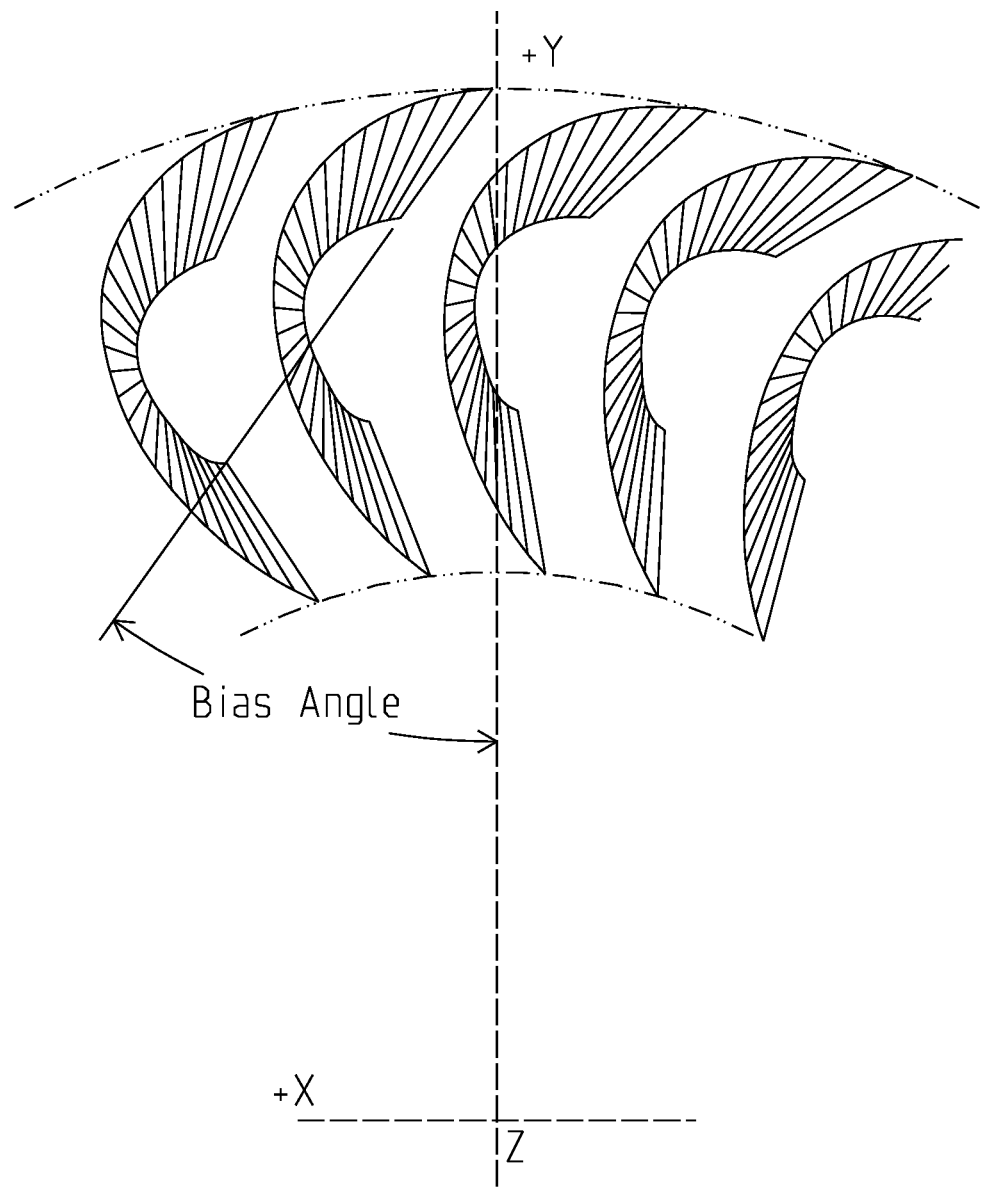
FIG. 11 illustrates blades with variable bias, according to some aspects described herein.

Biasing of blades of a torque converter (e.g., torque converter 100) is demonstrated in FIG. 10 (zero bias) and FIG. 11 (ruled bias). A blade that is not biased geometrically produces a relatively large, wetted surface and passage corners that are sharp; aspects that are in detriment to efficiency. Therefore, biasing is introduced to increase efficiency as well as provide non-parallel trailing and leading edges between adjacent components in the flow path; where momentary tip to root blade blockage occurs blades pass (in scenarios of relative speed between the adjacent components) Certain torus and blade designs of a torque converter (e.g. a torus reduced width torus) may present geometrical constraints that do not allow an effective biasing by traditional methods. Some torque converters provided herein in accordance with aspects of the present disclosure provide contrasting, non-parallel trailing and leading edges (between adjacent components in a flow path), such that biasing benefits may be realized where geometrical constraints may not otherwise allow for an appropriate amount of biasing by traditional methods. Though the disclosed torque convertor is particularly beneficial due to the design of its stator blades in a reduced width torus, the biasing disclosed herein with respect to stator blades may also apply to pump and turbine blade design. The disclosed non-linear biasing decreases cavitation potential of a torque converter, to allow greater input torques that would otherwise be of detriment to the torque converter's performance and durability.

In some examples, the stator blades (e.g., blades 120) disclosed herein are useful where a core ring size (e.g., a size of the core 112) has been minimized to maximize blade height within a torus (therefore optimizing usable fluid domain and capacity). In some examples, the stator blades disclosed herein are useful where biasing the pump blades is impractical due to available blade space and/or consideration of the resultant high stresses associated with oblique angles at attachment to the core ring. In some examples, the stator blades disclosed herein are useful to equalize or meter pump inlet flow (exiting the stator) in a flattened torus where there is inherently more restriction near the middle of a pump blade. Non-linear biasing may be achieved by using one or more biasing guides, which permit higher orders of curvature in a radial direction (e.g., root to tip of a blade). In some examples, two biasing guides are used to provide a third order curvature in the radial direction. In some examples, the biasing guides of a third (or higher) order curvature are offset on opposite sides of a neutral axis, such as to provide areas of both concave and convex curvature on a single working surface of a blade.

Figure 9B:
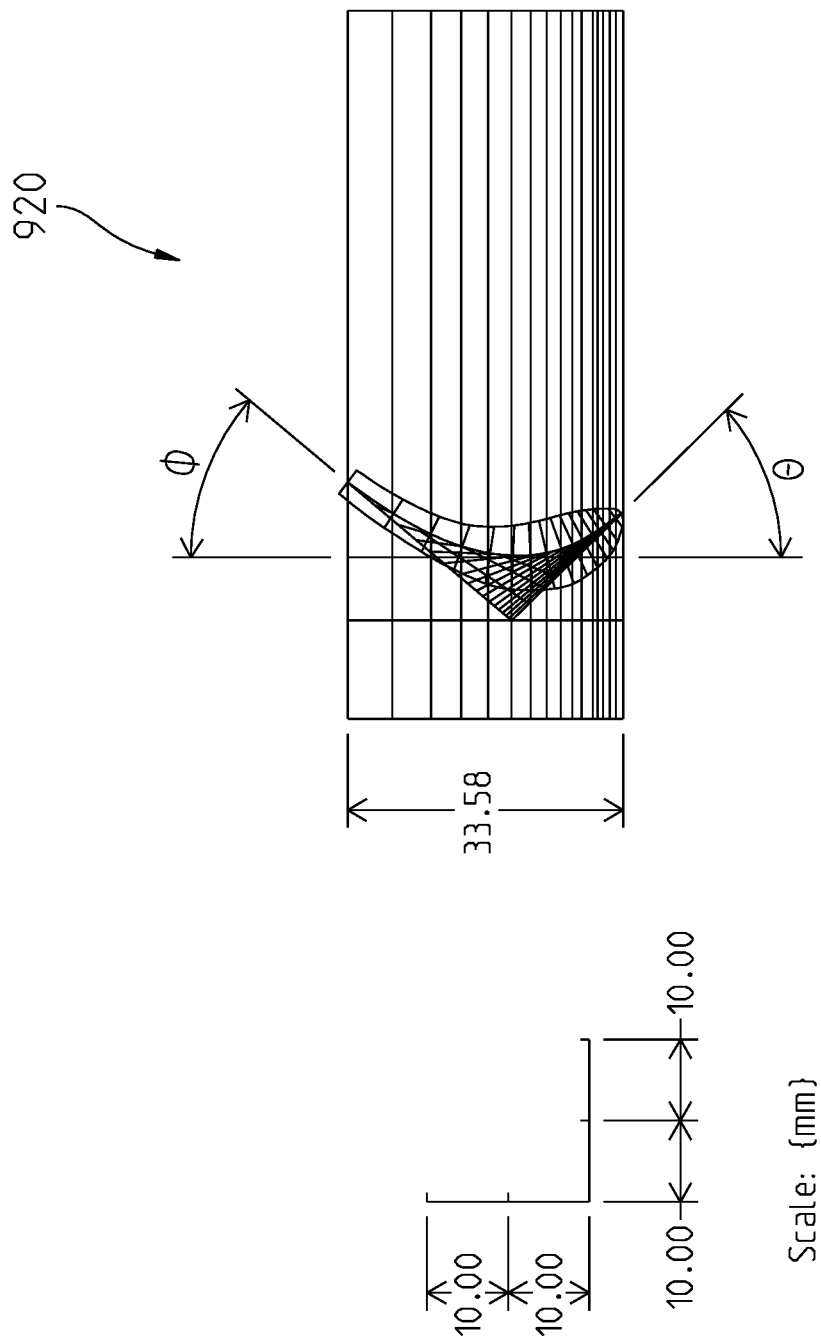
FIG. 9B illustrates a meridonial and longitudinal definition of the mean camber line of the blade of FIG. 8, according to some aspects described herein.
Figure 9C:
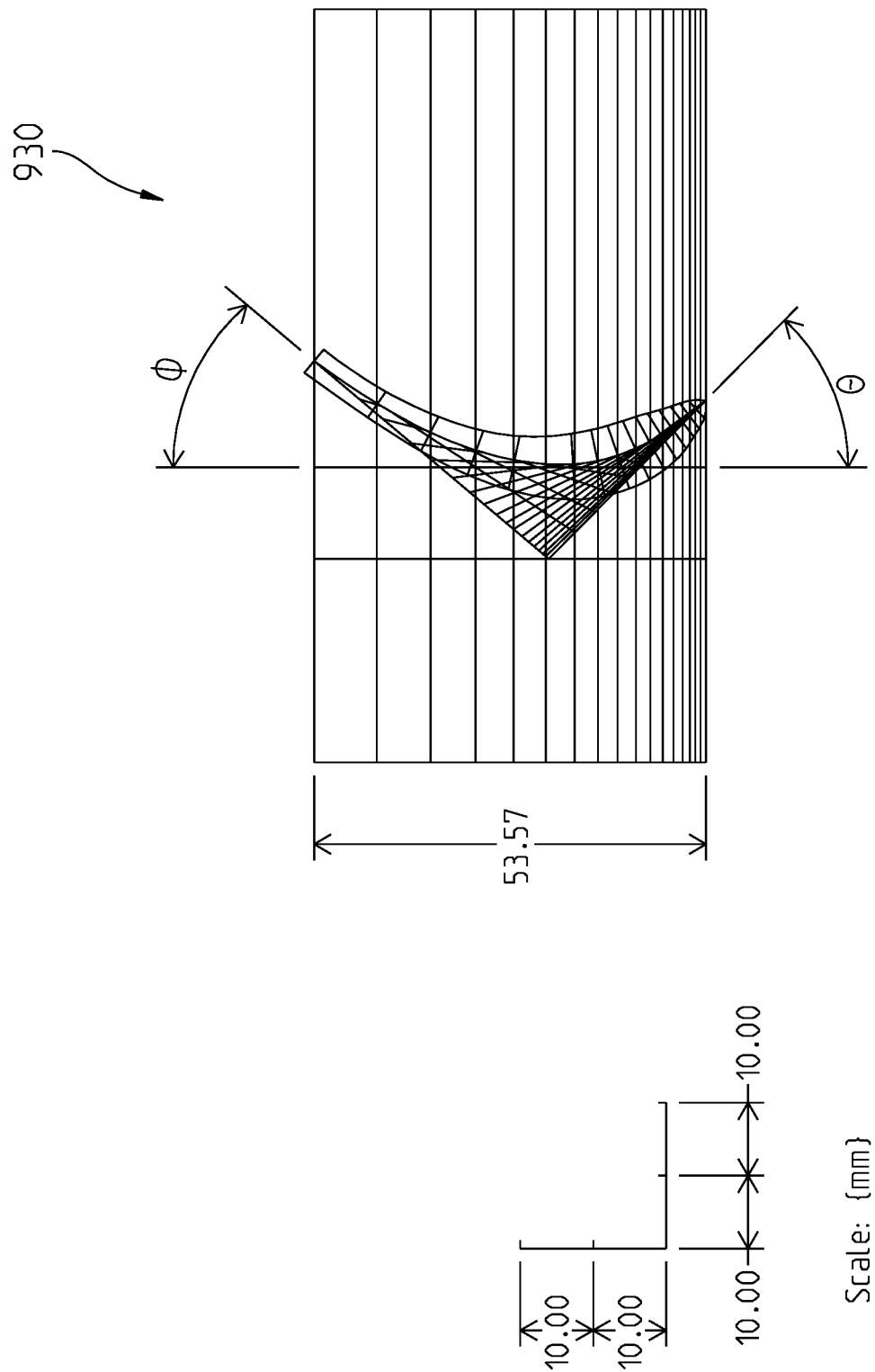
FIG. 9C illustrates a meridonial and longitudinal definition of the mean camber line of the blade of FIG. 8, according to some aspects described herein.

The projections of FIGS. 9A-9C were generated with a traditional, parabolic blade shape with variables of flow inlet angle, outlet angle and vertex location normalized along a toroidal section length of 13.65 (FIG. 9A), 33.58 (FIG. 9B), and 53.57 (FIG. 9C). The flow inlet angle defines an entry angle θ of the blade (e.g., an angle at which an incompressible fluid enters engagement with the blade). The flow outlet angle defines an exit angle Φ (e.g., an angle at which an incompressible fluid exits engagement with the blade). There are 3 sets of projections included in this design/optimization model, defined as shell (FIG. 9C), biasing guide (FIG. 9B), and core (FIG. 9A) projections. Each projection can have independent parameters for the basic variables, thereby defining independent entry angles θ and exit angles Φ for each of the projections, such as a first entry angle θ and exit angle Φ at the shell (FIG. 9C), a second entry angle θ and exit angle Φ at the mid guide (FIG. 9B), and a third entry angle θ and exit angle Φ at the core (FIG. 9A).

In some examples, the entry angle θ of at least one of the blades (e.g., blades 120) at the shell (e.g., shell 110) is greater than an entry angle of the at least one of the blades at the core (e.g., core 112) by a factor of between 2 and 6. In some examples, the entry angle θ of at least one of the blades (e.g., blades 120) at the shell (e.g., shell 110) is between about 40 degrees and about 50 degrees and at the core (e.g., core 112) is between about 5 degrees and about 15 degrees. These particular angles and ratios may be beneficial for controlling the flow of fluid and related pressurization within the torque converter.

In some examples, a ratio of the exit angle Φ of the least one of the blades (e.g., blades 120) at the shell (e.g., shell 110) to the exit angle Φ of the at least one of the blades at the core (e.g., core 112) is less than 1. In some examples, the exit angle Φ of at least one of the blades (e.g., blades 120) at the shell (e.g., shell 110) is between about 35 degrees and about 45 degrees and at the core (e.g., core 112) is between about 70 degrees and about 75 degrees. These particular angles and ratios may be beneficial for controlling the flow of fluid and related pressurization within the torque converter.

In some examples, the exit angle Φ of the least one of the blades (e.g., blades 120) at the mid guide is between about 35 degrees and about 45 degrees, or is about 40 degrees. In some examples, the entry angle θ of at least one of the blades (e.g., blades 120) at the mid guide is between about 40 degrees and about 50 degrees, or is about 45 degrees.

Figure 12:
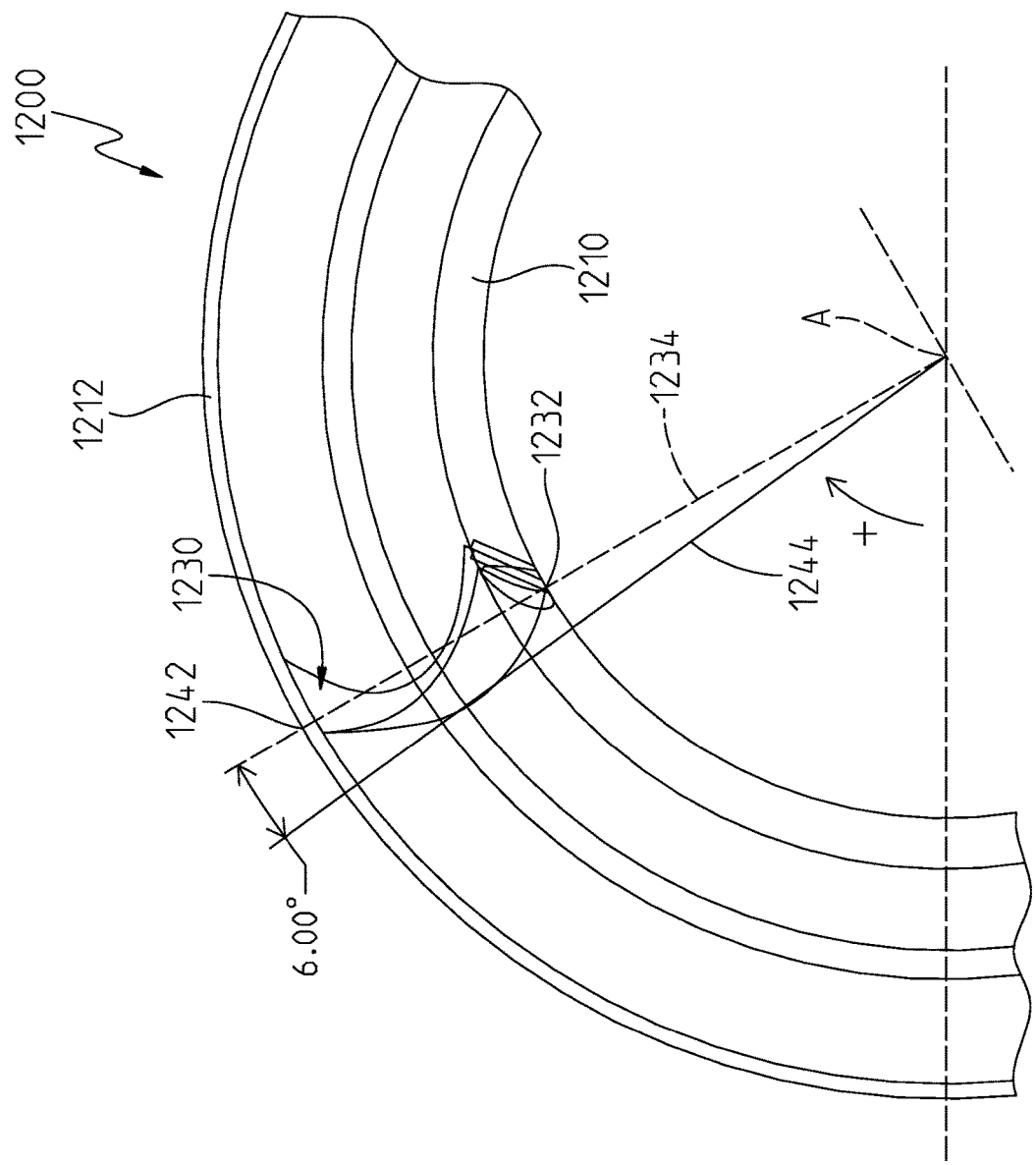
FIG. 12 illustrates a front planar view of a stator showing a non-linear biased blade with an offset, according to some aspects described herein.

FIG. 12 illustrates a front planar view of a stator 1200 showing a mean camber surface 1230 of a non-linear biased blade (not shown, but which may be similar to the blade 120 described earlier herein with respect to FIG. 4). The mean camber surface 1230 may be a representative surface that is fit between mean camber lines of projections, such as of the three projections defined by the stations lines 910, 920 and/or 930 of FIGS. 9A-9C. The mean camber surface 1230 has an angular offset, thereby causing a blade through which the plane 1230 extends centrally through to also have an angular offset. The stator 1200 may be similar and/or the same as the stator 102 described earlier herein with respect to FIG. 4. Further, the mean camber surface 1230 may be similar to and/or the same as a mean camber surface inherently defined by the blade 120 described earlier herein. For example, extruding curved surfaces from the mean camber surface 1230 (e.g., symmetrically extruding a body from and/or through the mean camber surface 130) may create a constant thickness blade, such as may be used in sheet metal torque converters.

In some examples, the mean camber surface 1230 includes a first point 1232 at which a blade through which the mean camber surface 1230 extends intersects a shell 1210 of the stator 1200. A line 1234 is extended from (e.g., orthogonally from) point 1232 to the axis of rotation A. In some examples, the mean camber surface 1230 further includes a second point 1242 at which a blade through which the mean camber surface 1230 extends intersects a core 1212 of the stator 1200. In some examples, the second point 1242 is coincident to the line 1234 extending through the axis of rotation A. In some examples, the second point 1242 is not coincident to line 1234, but is defined by an angular offset from line 1234 about the axis of rotation A. In some examples, the line 1234 is a first line and a second line 1244 extending through the axis of rotation A intersects a biasing guide of a blade through which the mean camber surface 1230 extends (e.g., biasing guide 126 of FIG. 8). In some examples, the first line 1234 and the second line 1244 define an angle therebetween with a value in the range of about 1 degree to about 10 degrees (in the clockwise (positive) direction about the axis of rotation A). Additionally, and/or alternatively, in some examples, the angle of the blades may be in a range of between about 1° to about 3°, about 1° to about 2°, or be about 10, or about 2°, or about 3°. Cavitation was found to be most effectively mitigated according to angles within/at these values. Outside of these values, cavitation was found to increase.

Figure 13:
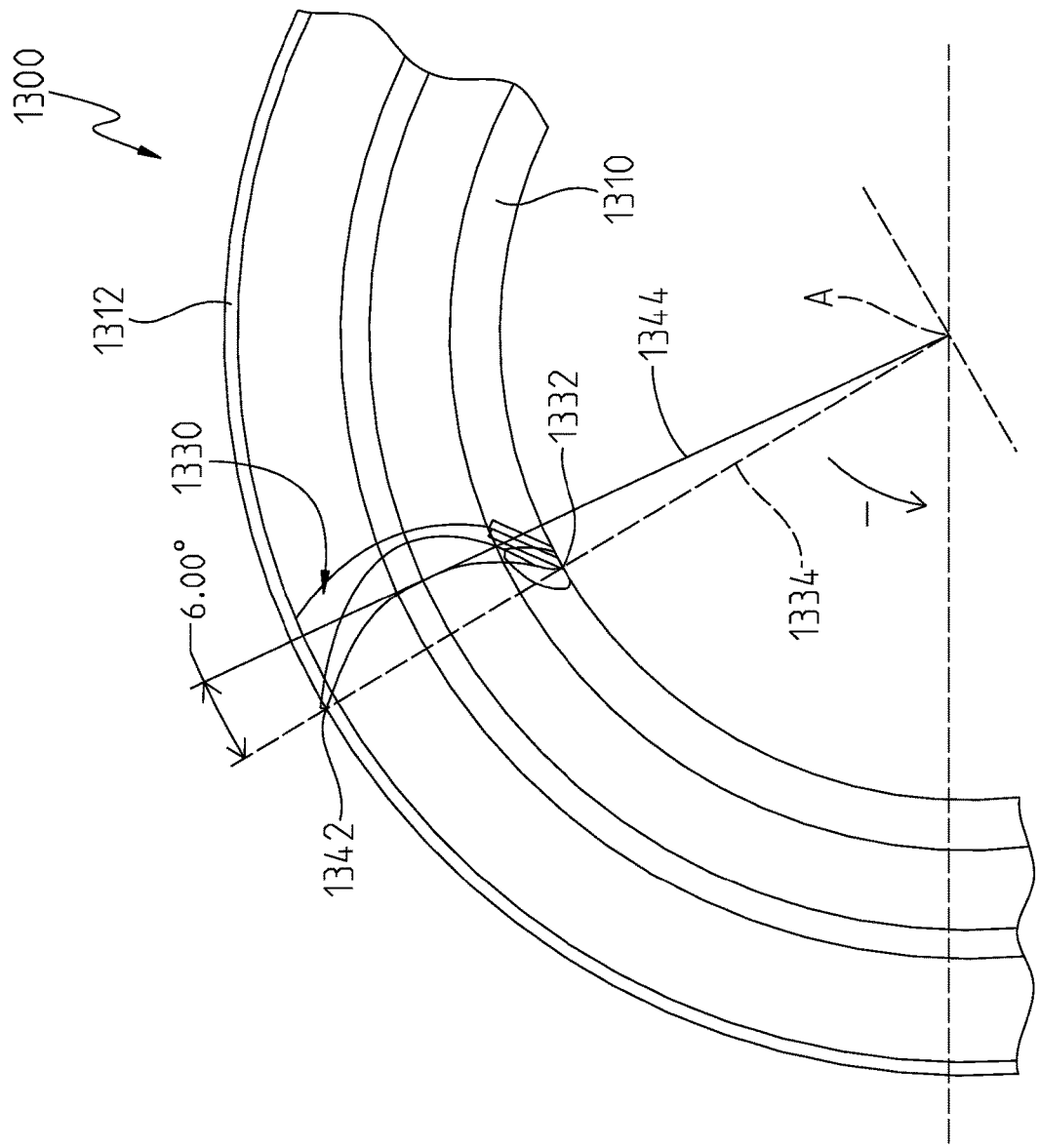
FIG. 13 illustrates a front planar view of a stator showing a non-linear biased blade with an offset, according to some aspects described herein.

FIG. 13 illustrates a front planar view of a stator 1300 showing a mean camber surface 1330 of a non-linear biased blade (not shown, but which may be similar to the blade 120 described earlier herein with respect to FIG. 2). The mean camber surface 1330 has an angular offset, thereby causing a blade through which the plane 1330 extends centrally through to also have an angular offset. The stator 1300 may be similar and/or the same as the stator 102 described earlier herein with respect to FIG. 4. Further, the mean camber surface 1330 may be similar and/or the same as a mean camber surface inherently defined by the blade 120 described earlier herein. For example, extruding curved surfaces from the mean camber surface 1330 (e.g., symmetrically extruding a body from and/or through the mean camber surface 130) may create the blade 120 of FIG. 4. The mean camber surface 1330 of FIG. 13 differs from the mean camber surface 1230 of FIG. 12 in that the mean camber surface 1330 has been shaped by a clockwise (negative) angular offset of the biasing guide 126 of FIG. 8.

In some examples, the mean camber surface 1330 includes a first point 1332 at which a blade through which the mean camber surface 1330 extends intersects a shell 1310 of the stator 1300. A line 1334 is extended from (e.g., orthogonally from) the first point 1332 1334 to the axis of rotation A. In some examples, the mean camber surface 1330 further includes a second point 1342 at which a blade through which the mean camber surface 1330 extends intersects a core 1312 of the stator 1300. In some examples, the second point 1342 is coincident to the line 1334 extending through the axis of rotation A. In some examples, the second point 1342 is not coincident to line 1334, but is defined by an angular offset from line 1334 about the axis of rotation A.

In some examples, the line 1334 is a first line and a second line 1344 extending through the axis of rotation A intersects a biasing guide of a blade through which the mean camber surface 1330 extends (e.g., biasing guide 126 of FIG. 8). In some examples, the first line 1334 and the second line 1344 define an angle therebetween with a value in the range of about 1 degree to about 10 degrees (in the clockwise (negative) direction about the axis of rotation A). Additionally, and/or alternatively, in some examples, the angle of the blades may be in a range of between about 1° to about 3°, about 1° to about 2°, or be about 10, or about 2°, or about 3°. Cavitation was found to be most effectively mitigated according to angles within/at these values. Outside of these values, cavitation was found to increase.

Figure 14A:
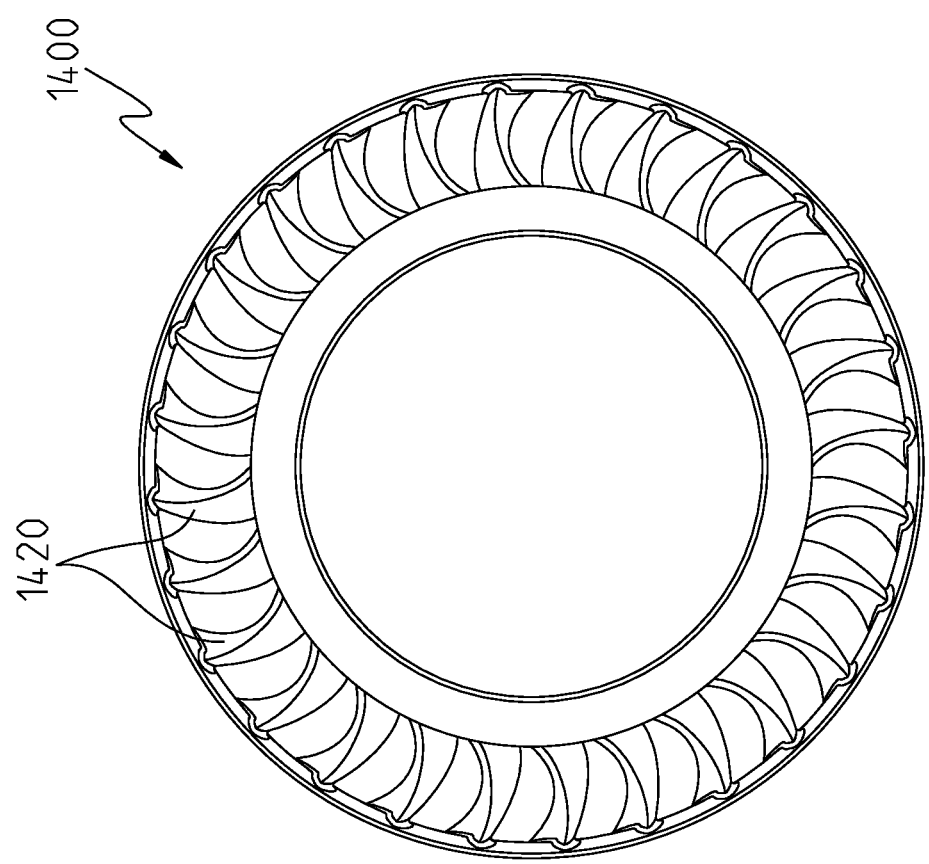
FIG. 14A illustrates a stator according to some aspects described herein.
Figure 14B:
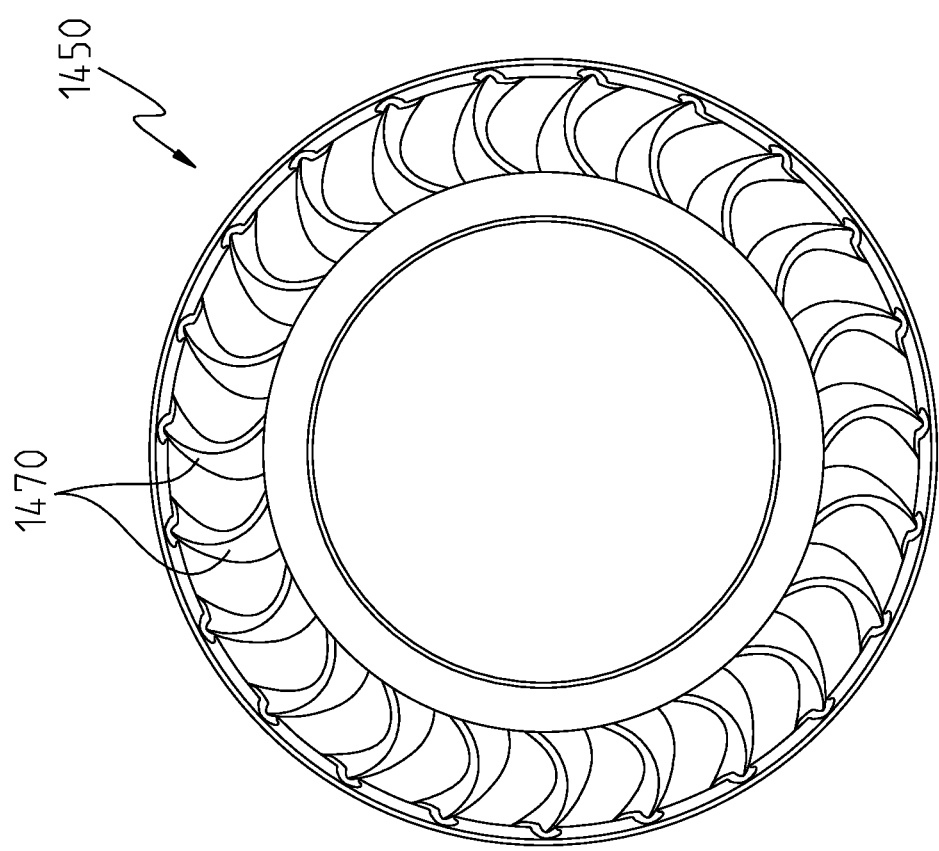
FIG. 14B illustrates a stator according to some aspects described herein.

FIG. 14A illustrates a stator 1400 according to some aspects described herein. The stator 1400 may be similar to the stator 1420 described earlier herein with respect to FIG. 4. The stator 1400 includes a plurality of blades 1420. The plurality of blades 1420 is 28 blades in the example stator 1400. The 28 blades have a 4 degree offset. FIG. 14B illustrates a stator 1450 according to some aspects described herein. The stator 1450 includes a plurality of blades 1470. The plurality of blades 1470 is 23 blades in the example stator 1450. The 23 blades have an 8 degree offset. The plurality of blades 1420 and/or 1470 may be the same as or similar to the plurality of blades 140 described earlier herein with respect to FIG. 4.

It should be recognized by those of ordinary skill in the art that the stators 1400, 1450 are merely examples. Alternative stators may be designed based on teachings provided herein that have any number of blades. In some examples, the offset of the blades may be in range of between about 10 to about 100 (in the clockwise (negative) or counterclockwise (positive) direction about an axis of rotation of the stator and/or a torque converter that includes the stator). Additionally, and/or alternatively, in some examples, the offset of the blades may be in a range of between about 1° to about 3°, about 1° to about 2°, or be about 10, or about 2°, or about 3°. Cavitation was found to be most effectively mitigated according to angles within/at these values. Outside of these values, cavitation was found to increase. In some examples, fewer cavitation activities were found to occur as the offset of the blades increased from a negative angle value to a positive angle value, such as within the ranges of angle values provided above.

Generally, the torque converter provided herein includes a compact design that reduces space claim (e.g., an amount of volumetric space occupied) of the torque converter for increased power density of an overall transmission assembly. Further, the curved blades of the torque converter help to mitigate cavitation, thereby allowing the torque converter to work more effectively and improve a lifetime thereof.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A torque converter, the torque converter comprising:
   a shell extending about an axis of rotation;
   a core extending about the axis of rotation; and
   a plurality of curved blades extending contactedly from the shell to the core, wherein at least one blade of the plurality of curved blades comprises a non-ruled surface curving between the shell and the core, and
   wherein the at least one blade of the plurality of curved blades narrows as it extends from the shell to the core.

2. The torque converter of claim 1, wherein a meridonial length of the at least one blade of the plurality of curved blades at the shell is greater than a meridonial length of the at least one blade of the plurality of curved blades at the core by a factor of between 2 and 6, thereby causing the at least one blade of the plurality of curved blades to narrow as it extends from the shell to the core, the meridonial lengths being measured in a direction along a flow through the torque converter.

3. The torque converter of claim 1, further comprising:
   a pump extending about the axis of rotation, and around the plurality of blades;
   a first radius defined between the axis of rotation and a point along the pump; and
   a second radius defined between the axis of rotation and a point along the shell opposite the point along the pump, wherein the second radius extends coaxially along the first radius, wherein the first radius subtracted by the second radius defines a height of the torque converter, and wherein a ratio of a width of the torque converter, as measured along the axis of rotation, to the height of the torque converter is about 0.75, thereby defining an oblong profile of the torque converter.

4. The torque converter of claim 1, wherein an entry angle of the at least one blade of the plurality of curved blades at the shell is greater than an entry angle of the at least one blade of the plurality of curved blades at the core by a factor of between 2 and 6.

5. The torque converter of claim 1, wherein the at least one blade of the plurality of curved blades further comprises:
a first point at which the at least one blade intersects the shell, the first point being coincident to a line extending orthogonally through the axis of rotation, and
a second point at which the at least one blade intersects the core, the second point also being coincident to the line extending through the axis of rotation.

6. The torque converter of claim 5, wherein the line is a first line, wherein a second line extending through the axis of rotation intersects a mid-guide of the at least one blade, and wherein the first line and the second line define an angle therebetween with a value in the range of about 1 degree to about 10 degrees.

7. The torque converter of claim 1, wherein the plurality of curved blades are configured for use with an incompressible fluid.

8. The torque converter of claim 1, wherein the plurality of curved blades are cast metal or machined.

9. The torque converter of claim 1, wherein the core extends about the shell.

10. The torque converter of claim 1, wherein the non-ruled surface curves along the shell and the core, and wherein a definition of curvature of the non-ruled surface along the shell is different than a definition of curvature of the non-ruled surface along the core.

11. A torque converter, the torque converter comprising:
a shell extending about an axis of rotation;
a core extending about the axis of rotation; and
a plurality of curved blades configured for use with an incompressible fluid, wherein the plurality of blades extend between the shell and the core, and wherein at least one blade of the plurality of curved blades comprises:
a first point at which the at least one blade intersects the shell, the first point being coincident to a line extending orthogonally through the axis of rotation, and
a second point at which the at least one blade intersect the core, the second point also being coincident to the line extending through the axis of rotation,
wherein the at least one of the plurality of curved blades comprises a non-ruled surface curving between the shell and the core.

12. The torque converter of claim 11, wherein the at least one blade of the plurality of curved blades extends contactedly from the shell to the core.

13. The torque converter of claim 11, wherein the line is a first line, wherein a second line extending through the axis of rotation intersects a mid-guide of the at least one blade, and wherein the first line and the second line define an angle therebetween with a value in the range of about 1 degree to about 10 degrees.

14. The torque converter of claim 11, wherein the at least one blade of the plurality of curved blades narrows as it extends from the shell to the core.

15. The torque converter of claim 14, wherein a meridonial length of the at least one blade of the plurality of curved blades at the shell is greater than a meridonial length of the at least one blade of the plurality of curved blades at the core by a factor of between 2 and 6, thereby causing the at least one blade of the plurality of curved blades to narrow as it extends from the shell to the core, the meridonial lengths being measured in a direction along a flow through the torque converter.

16. The torque converter of claim 11, wherein an entry angle of the at least one blade of the plurality of curved blades at the shell is greater than an entry angle of the at least one blade of the plurality of curved blades at the core by a factor of between 2 and 6.

17. The torque converter of claim 11, wherein the plurality of blades are cast metal or machined.

18. A torque converter, the torque converter comprising:
a shell extending about an axis of rotation;
a core extending about the axis of rotation;
a plurality of blades curving contactedly from the shell to the core;
a turbine extending about the axis of rotation, and around the plurality of blades;
a first radius defined between the axis of rotation and a point along the turbine; and
a second radius defined between the axis of rotation and a point along the shell opposite the point along the turbine, wherein the second radius extends coaxially along the first radius, wherein the first radius subtracted by the second radius defines a height of the torque converter, and wherein a ratio of a width of the torque converter, as measured along the axis of rotation, to the height of the torque converter is about 0.75, thereby defining an oblong profile of the torque converter.

19. The torque converter of claim 18, wherein the plurality of blades comprise a nonruled surface.

20. The torque converter of claim 18, wherein at least one blade of the plurality of blades comprises:
a first point at which the at least one blade intersects the shell, the first point being coincident to a line extending orthogonally through the axis of rotation, and
a second point at which the at least one blade intersect the core, the second point also being coincident to the line extending through the axis of rotation.

21. The torque converter of claim 18, wherein a meridonial length of the at least one blade of the plurality of blades at the shell is greater than a meridonial length of the at least one blade of the plurality of blades at the core by a factor of between 2 and 6, thereby causing the at least one blade of the plurality of blades to narrow as it extends from the shell to the core, the meridonial lengths being measured in a direction along a flow through the torque converter.

22. The torque converter of claim 18, wherein an entry angle of the at least one blade of the plurality of blades at the shell is greater than an entry angle of the at least one blade of the plurality of blades at the core by a factor of between 2 and 6.

* * * * *